(12) United States Patent
Tustison et al.

(10) Patent No.: US 6,995,658 B2
(45) Date of Patent: Feb. 7, 2006

(54) DIGITAL COMMUNICATION OVER 28VDC POWER LINE

(75) Inventors: Ronald M. Tustison, St. Peters, MO (US); Mark A. Shelton, Florissant, MO (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 10/459,840

(22) Filed: Jun. 11, 2003

(65) Prior Publication Data

US 2004/0258141 A1 Dec. 23, 2004

(51) Int. Cl.
*H04M 11/04* (2006.01)

(52) U.S. Cl. ............... 340/310.01; 340/310.07; 375/219

(58) Field of Classification Search ......... 340/310.01–310.08; 370/464; 375/219
See application file for complete search history.

(56) References Cited

U.S. PATENT DOCUMENTS

| | | | | |
|---|---|---|---|---|
| 3,909,821 A | * | 9/1975 | Jagoda et al. | 340/310.03 |
| 4,973,940 A | | 11/1990 | Sakai et al. | 340/310 R |
| 5,241,283 A | * | 8/1993 | Sutterlin | 330/51 |
| 5,349,644 A | * | 9/1994 | Massey et al. | 706/10 |
| 5,351,272 A | | 9/1994 | Abraham | 375/38 |
| 5,391,932 A | | 2/1995 | Small et al. | 307/125 |
| 6,040,759 A | | 3/2000 | Sanderson | 340/310.01 |
| 6,480,510 B1 | * | 11/2002 | Binder | 370/502 |
| 2003/0045970 A1 | * | 3/2003 | Maryanka | 700/293 |

FOREIGN PATENT DOCUMENTS

| | | |
|---|---|---|
| EP | 0463341 A | 1/1992 |
| EP | 0913954 A | 5/1999 |
| EP | 1134909 A | 9/2001 |
| EP | 1322047 A | 6/2003 |

OTHER PUBLICATIONS

Alex Romanelli, "Ti Gets Jump on Power over Ethernet", Electronic News Today, Apr. 28, 2003, Reed Business Information, New York, NY, USA.

* cited by examiner

*Primary Examiner*—Phung T. Nguyen
(74) *Attorney, Agent, or Firm*—Shimokaji & Associates, P.C.

(57) ABSTRACT

A power line modem interface includes a modem that modulates an RF signal with digital data and demodulates an RF signal to recover digital data. A filter is connected to the modem and to a DC power line that supplies power to a local power supply. The filter couples the RF signals from the modem to the DC power line and filters the RF signals out of the local power supply. The filter includes: a first inductance connected to a hot side of the DC power line; a second inductance connected in series with the first inductance and connected to the local power supply; and a capacitance with a first plate connected between the first inductance and the second inductance and a second plate connected to the modem so that the RF signal is passed between the modem and the DC power line.

26 Claims, 5 Drawing Sheets

DIGITAL COMMUNICATION OVER 28VDC POWER LINE

BACKGROUND OF THE INVENTION

The present invention generally relates to communication over power lines and, more particularly, to providing both direct current power and digital communications simultaneously on the same wire for avionics and control systems in airborne vehicles and spacecraft.

Current airborne vehicle electronics—such as that which is used for military or commercial aircraft or satellites—are typically controlled through data quality wiring that connects the avionic units in digital networks. Data quality wiring, for example, may be twisted shielded pair wiring. Data communication in military aircraft is commonly achieved using communication as specified by military standard MIL-STD-1553, hereafter referred to as "1553 communication", as known in the art, to link the avionics boxes, i.e. avionics units, together into digital networks. Airborne vehicle wiring can include hundreds of feet of wire. A small jet fighter, for example, may have 20 avionics systems that are connected to each other via a digital network. The data quality network wiring can add considerable amount of weight to an aircraft or to a spacecraft—such as a satellite. Weight and volume are critical design constraints for any aircraft or spacecraft, so that any weight and volume savings that can be achieved in the design of an aircraft or spacecraft—such as eliminating the weight of data quality network wiring, along with the spatial volume occupied by such wiring—can be an important benefit to the performance of the aircraft or spacecraft.

FIG. 1 shows a prior art example of network wiring and power lines for a system 100 that is typical for aircraft and spacecraft. System 100 may include a number of avionics units, or boxes, 102—such as avionic unit 102a, avionics unit 102b, and avionics unit 102c. An avionics unit may perform any of several functions important to an aircraft. Aircraft avionics are generally partitioned into subsystems such as RADAR, weapons, flight controls, displays, and so forth. The RADAR and flight instruments, for example, would be considered as components in separate subsystems. System 100 illustrates how communication may be achieved between different subsystems in an aircraft or spacecraft. Each avionics unit 102 may include host electronics 104 specific to some particular avionics function. For example, avionics unit 102a may include host electronics 104a for a sensor that may receive a radar signal, and avionics unit 102b may include host electronics 104b for a display such as a cockpit instrument panel display. Also, avionics unit 102c may include host electronics 104c, which may be, for example, a radio transmitter or receiver. In a more general context, host electronics 104 may include any digital device such as a computer microprocessor or a computer.

Avionics system 100 may require, for example, that host electronics 104a communicate that it has received the radar signal to host electronics 104b for display. Thus, host electronics 104a may provide data 108 to modem 106a. Modem 106a may modulate a signal 110 with data 108, for example, using pulse code modulation (PCM), phase shift keying (PSK), or frequency shift keying (FSK). Signal 110 may be transmitted over data quality wiring 112 of network 114. For example, wiring 112 may be twisted shielded pair wiring, as described above. Network 114 may use "1553 communication", Ethernet protocol, or other protocol for routing signal 110 over bus 116 to modem 106b, as signal 110 may also be received by modem 106c, as seen in FIG. 1. Modem 106b may demodulate signal 110 to recover data 108.

A conventional twisted pair network—such as network 114—generally requires adherence to a rigid bus topology in order to minimize bus reflections and insure proper impedance matching, for example, at terminations 118, to insure good bus performance. A failure to comply with the bus topology requirements can result in reduced performance of bus 116 and network 114. Additional wiring—such as wiring 112—may also be needed for the sole purpose of satisfying the bus topology constraints.

Avionics system 100 may also include a power line network 120 for providing power to the avionics units 102. Power line network 120 may supply 28 Volt direct current (VDC) power 121, for example, to local power supplies 122a–122c. Each local power supply 122 may provide power 124 to modems 106a–106c and may provide power 126 to avionics host electronics 104a–104c. For example, each local power supply 122 may typically supply power at 1.5 VDC, 3.3 VDC, 5.0 VDC, or combinations of voltages.

FIG. 2 shows an example of a prior art alternating current (AC) power line modem 200 that may be used to provide digital communications over a power line, also referred to as power line networking. Power line modem 200 may be used to provide power line networking, for example, over 115 VAC wiring—such as common household or building wiring. Power line networking is currently being used, for example, to provide Internet access to homes through community power grids. As seen in FIG. 2, for example, 115 VAC power may be provided over power line 202, which may comprise a "hot" side 202a and a "neutral" or ground side 202b, to a local power supply 204. Local power supply 204 may provide direct current power 206 to modem 208. Local power supply 204 may also provide direct current power 210 at power outputs 212 for powering other equipment, such as a personal computer (not shown), for example. Local power supply 204 may typically supply power 206 and 210 at 1.5 VDC, 3.3 VDC, 5.0 VDC, or combinations of voltages.

A data signal 214 may also be transmitted or received over power line 202. Data signal 214 may be coupled to modem 208 through transformer 216. Transformer 216 may be a balun transformer for proper impedance matching and minimization of signal losses. Modem 208 may modulate data signal 214 with data 218 to produce and transmit data signal 214 or modem 208 may receive data signal 214 and demodulate data signal 214 to recover data 218. Communications protocols, such as Ethernet, may be used to allow multiple users (i.e., nodes) to share the network bus, i.e., power line 202. Data signal 214 may be modulated, for example, using techniques such as PCM, PSK, or FSK, as described above. Thus, power line 202 may be used for both power transmission and for data transmission as a network bus.

As seen in the example presented in FIG. 2, use of power transmission lines for data communications can eliminate the need for separate data communications lines, such as the data quality wiring 112 of network 114 seen in FIG. 1. By eliminating redundant wiring in an avionics system in an aircraft or spacecraft, such as wiring 112 in avionics system 100, significant weight savings can be achieved for the aircraft or spacecraft. Weight is a design constraint of any air or space vehicle. Reducing the number of wires used by the avionics reduces the weight of an air vehicle, enhancing the performance and capabilities of the vehicle. The transformer coupling of data signals to power lines—for example, the coupling of data signal 214 to modem 208 shown in FIG.

2—is not appropriate, however, for use with direct current power systems such as the 28 VDC power systems typically found in aircraft and used to power avionics systems, such avionics system 100 shown in FIG. 1. The transformer coupling using transformer 216, for example, is not appropriate because the primary winding of transformer 216, as shown in FIG. 2, wired from "hot" side 202a across power line 202 to "neutral" or ground side 202b, would short out local power supply 204 if direct current were being used.

As can be seen, there is a need for communication over power lines in order to share a single wire that simultaneously provides both direct current power and digital communications for avionics and control systems in airborne vehicles and spacecraft. Also there is a need for reduction, through communication over power lines, of the amount of wiring used by avionics and control systems in aircraft and spacecraft to reduce weight and save space inside the aircraft or spacecraft.

SUMMARY OF THE INVENTION

In one aspect of the present invention, a power line modem includes a modem that modulates an RF signal with digital data and a filter. The filter is connected to the modem and couples the RF signal from the modem to a DC power line.

In another aspect of the present invention, a power line modem includes: a modem that demodulates an RF signal to recover digital data; and a filter, connected to the modem and to a DC power line, wherein the filter couples the RF signal from the DC power line to the modem.

In still another aspect of the present invention, a filter couples an RF signal from a modem to a DC power line that supplies power to a local power supply. The filter includes: a first inductance connected to a hot side of the DC power line; a second inductance connected in series with the first inductance and connected to the local power supply; and a capacitance with a first plate connected between the first inductance and the second inductance and a second plate connected to a modem so that the RF signal is passed between the modem and the DC power line.

In yet another aspect of the present invention, an avionics unit includes: host electronics, a modem, a microcontroller, a filter, and a local power supply. The host electronics has a dual ported RAM interface. The modem modulates a first RF signal with digital data (first digital data) and demodulates a second RF signal to recover digital data (second digital data). The microcontroller is connected in the modem and interfaces the modem with the host electronics through the dual ported RAM. The microcontroller receives the first digital data from the host electronics and the microcontroller sends the second digital data to the host electronics. The filter is connected to the modem and to a DC power line so that the filter couples the first RF signal from the modem to the DC power line and couples the second RF signal from the DC power line to the modem. The local power supply is connected to the DC power line and connected to the filter, so that the filter passes the RF signal to the modem; and the filter filters out the RF signal from the local power supply.

In a further aspect of the present invention, an avionics system includes: a DC power line, a local power supply, host electronics, a modem, a microcontroller, and a filter. The DC power line supplies a 28 VDC power. The local power supply is connected to a DC return of the DC power line. The host electronics has a dual ported RAM, interface. The modem modulates a first RF signal with first digital data and demodulates a second RF signal to recover second digital data. The microcontroller is connected in the modem and interfaces the modem with the host electronics through the dual ported RAM, the microcontroller receiving the first digital data from the host electronics and the microcontroller sending the second digital data to the host electronics. The filter is connected to the modem and to a hot side of the DC power line so that the filter couples the first RF signal from the modem to the DC power line and couples the second RF signal from the DC power line to the modem. The filter is also connected to the local power supply so that the filter filters out the RF signal from the local power supply. The filter includes: a first inductance connected to a hot side of the DC power line; a second inductance connected in series with the first inductance and connected to the local power supply; and a capacitance with a first plate connected between the first inductance and the second inductance and a second plate connected to the modem so that the first RF signal is passed from the modem to the DC power line and the second RF signal is passed from the DC power line to the modem.

In a still further aspect of the present invention, a method for digital communication over a DC power line includes steps of: modulating an RF signal with digital data at a first modem; coupling the RF signal from the first modem to the DC power line through a filter; coupling the RF signal from the DC power line to a second modem through a second filter; and demodulating the data from the RF signal at the second modem.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, one embodiment of the present invention provides digital communication over power lines, and in particular, direct current power lines such as those used in military and commercial aircraft and in spacecraft. The number of wires used, for example, by an avionics or control system of the aircraft or spacecraft, can be reduced in the embodiment as compared to the prior art, saving both weight and space in the aircraft or spacecraft. One embodiment uses 28 Volt direct current (VDC) power lines of an aircraft power system as an interconnect bus for digital communications for an aircraft avionics system. The 28 VDC power on the power line wire has an effective signal frequency of zero. The digital communication may be effected on analog signal frequency channels between 2 and 20 mega-Hertz (MHz). The embodiment allows, through frequency division, for both signals, i.e., power and digital communication, to coexist on the same wire. A novel aspect of one embodiment is the use of a filter to send and receive the analog signals (carrying the digital communication) to the 28 VDC power line, in contrast to the prior art, which is only appropriate for use with alternating current (AC) power lines. In another embodiment, both power and control can be provided on the same wire to vehicle control surfaces, for example, in contrast to prior art control systems requiring control lines separate from direct current (DC) power lines. The embodiment may also reduce the weight of vehicle control systems compared to prior art aircraft or spacecraft vehicle control systems.

Figure 3:
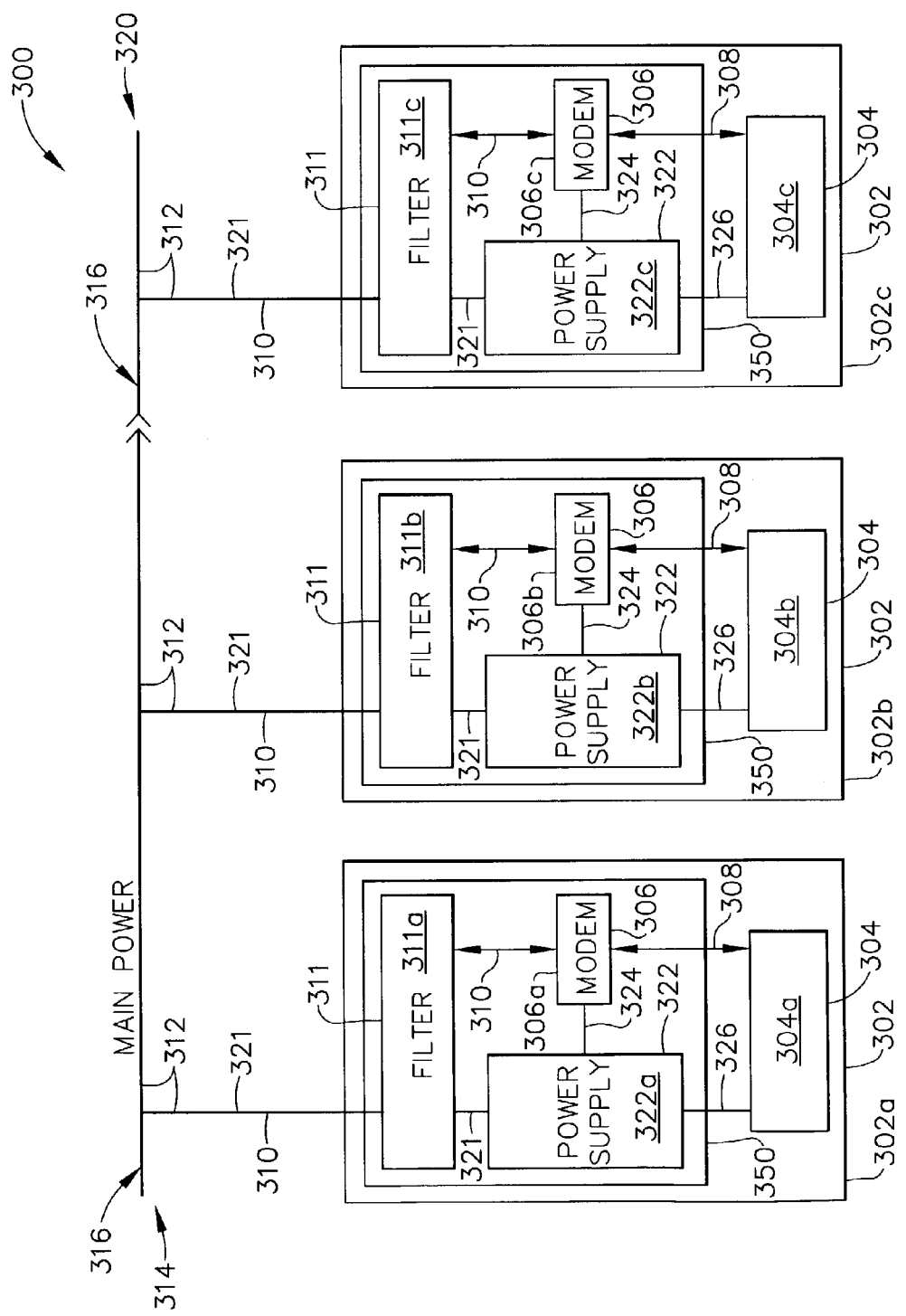
FIG. 3 is a network diagram illustrating digital communications and power supply connections for an exemplary avionics system, according to an embodiment of the present invention.

Referring now to FIG. 3, FIG. 3 illustrates an exemplary avionics system 300, according to one embodiment, that employs digital communications using power supply lines. Avionics system 300 may include a number of avionics units, or boxes, 302—such as avionic unit 302a, avionics unit 302b, and avionics unit 302c. An avionics unit may perform any of several functions important to an aircraft or spacecraft. Each avionics unit 302 may include host electronics 304 specific to some particular avionics function. For example, avionics unit 302a may include host electronics 304a for a sensor that may receive a radar signal, and avionics unit 302b may include host electronics 304b for a display such as a cockpit instrument panel display. Also, avionics unit 302c may include host electronics 304c, which may be a radio transmitter-receiver, for example.

Avionics system 300 may require, for example, that host electronics 304a communicate to host electronics 304b that host electronics 304a has received a radar signal for display. Thus, host electronics 304a may provide data 308 to modem 306a. Modem 306a may modulate a radio frequency (RF) signal 310 with data 308, for example, using pulse code modulation (PCM), phase shift keying (PSK), frequency shift keying (FSK), or any other form of modulation suitable for transmitting digital data at RF frequencies to provide narrow band operation at frequencies that are not highly attenuated on the power line. RF signal 310 may be passed through a filter 311—such as filters 311a, 311b, and 311c —that isolates the modem 306 electronics from the DC power on power line 312. For example, a filter such as that shown in FIG. 4 and described in more detail below may be used. RF signal 310 may be transmitted over the wire of power line 312 to use power line 312 as a data network 314. Data network 314 may use a power line protocol much like Ethernet protocol to allow multiple users or nodes—such as avionic units 302a, 302b, and 302c—to share the bus 316 of data network 314. Thus, signal 310 may be routed over bus 316 to modem 306b, as well as to modem 306c, but may be demodulated and used only by the intended recipient, i.e., modem 306b. Modem 306b may demodulate signal 310 to recover data 308.

The wire of power line 312 of avionics system 300 may form a power line network 320 for providing power to the avionics units 302. Power line network 320 may supply 28 Volt direct current (VDC) power 321, for example, to local power supplies 322a–322c. Each local power supply 322 may provide power 324 to modems 306a–306c. For example, power 324 may be supplied at 1.5 VDC, 3.3 VDC, 5.0 VDC, or a combination of those voltages. Each local power supply 322 may provide power 326 to avionics host electronics 104a–104c. For example, power 326 may be supplied at 1.5 VDC, 3.3 VDC, 5.0 VDC, or a combination of those voltages.

Figure 1:
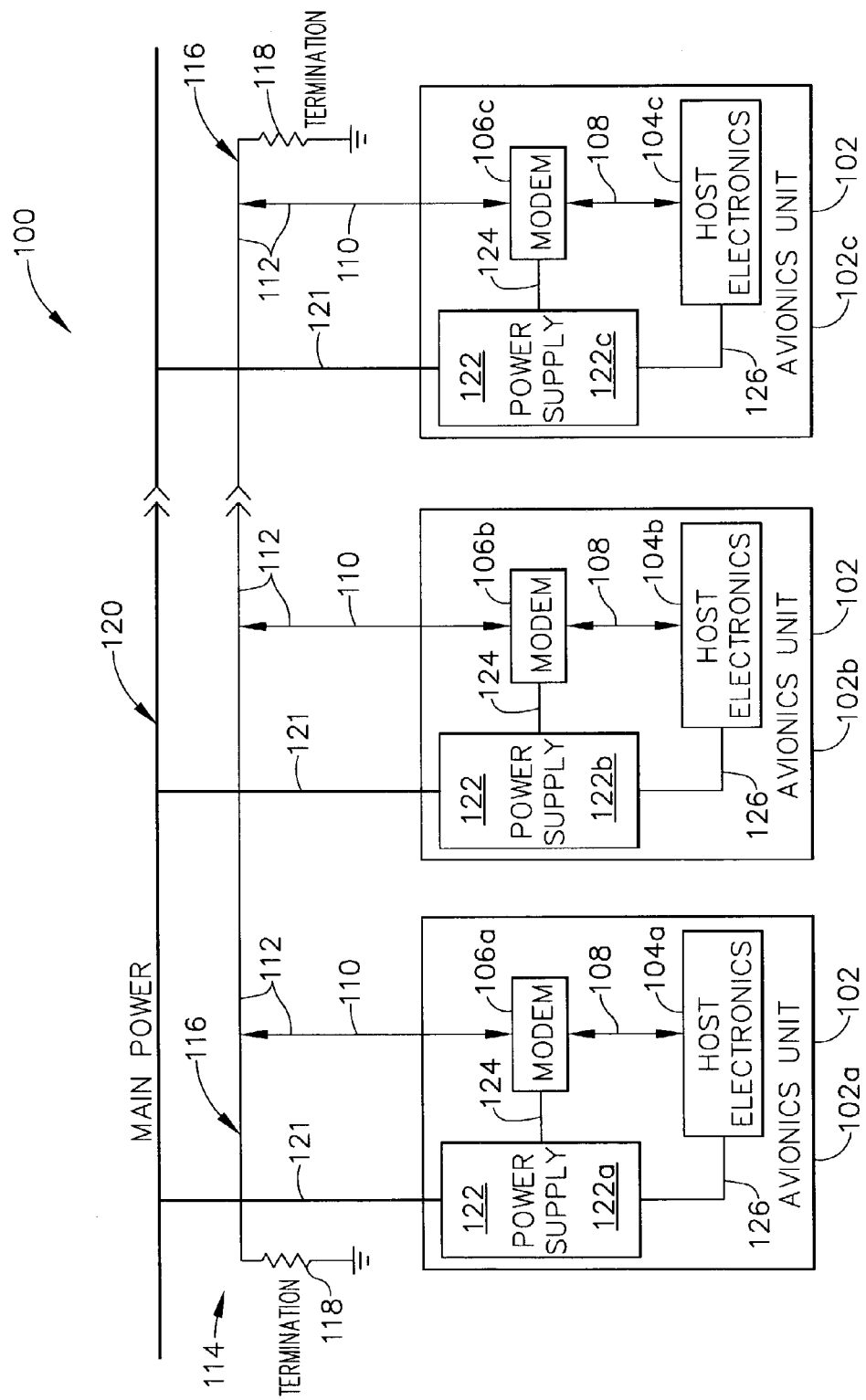
FIG. 1 is a system block diagram showing digital communications and power supply connections for an exemplary prior art avionics system.
Figure 2:
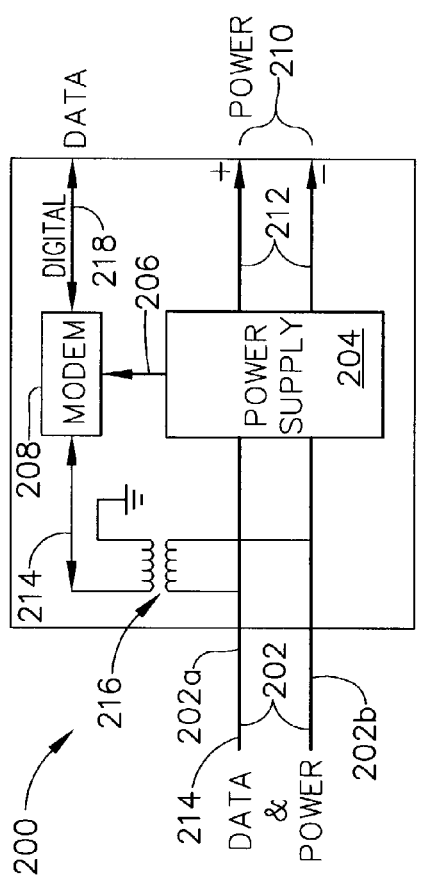
FIG. 2 is a block diagram showing digital communications and power supply connections for an exemplary prior art AC power line modem.
Figure 4:
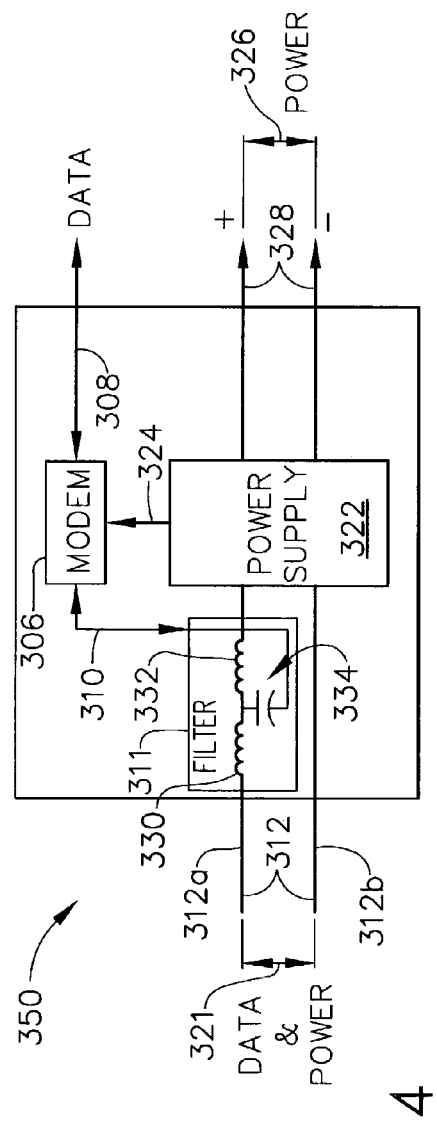
FIG. 4 is an avionics interface block diagram illustrating digital communications and power supply connections for a power line modem interface, according to one embodiment of the present invention.

Referring now to FIGS. 3 and 4, FIG. 4 illustrates a power line modem interface 350, according to one embodiment of the present invention. For example, power line modem interface 350 may be a power line modem interface 350 as shown in FIG. 3, and may include modem 306, local power supply 322, and filter 311. Power line modem 350 may receive (or provide) data 308 from (to) a host avionics unit—for example, any of avionics units 302 shown in FIG. 3. Data 308 may be used by modem 306 to modulate an RF signal 310, or RF signal 310 may be demodulated by modem 306 to provide data 308, as described above. Also as described above, local power supply 322 may provide power 324 to modem 306, and may also provide power 326 at power outputs 328, for example, to electronics of the host avionics unit—such as any of avionics units 302 shown in FIG. 3. Data and power may be provided to power line modem 350 by power line 312. Power line 312 may include a "hot" side 312a and a DC return 312b. For example, power line 312 may be connected to an aircraft or spacecraft main power supply that maintains a voltage of 28 VDC between hot side 312a and DC return 312b.

Modem 306 may be coupled to power line 312 via filter 311 so that RF signal 310 may be passed to (or from) modem 306 by filter 311 from (to) power line 312. In other words, filter 311 is symmetric with respect to the direction of propagation of RF signal 310 so that RF signal 310 may be passed in either direction by filter 311, depending on whether RF signal 310 is being received by modem 306 or is being transmitted by modem 306. Filter 311 also may filter DC power—such as 28 VDC power 321—from power line 312 to local power supply 322. In other words, filter 311 may provide DC power from power line 312 to local power supply 322 with voltage fluctuations due to RF signal 310 filtered out, i.e., reduced below some nominal level.

As shown in FIG. 4, filter 311 may include a first inductance 330 and second inductance 332 connected in series between hot side 312a of power line 312 and local power supply 322. Filter 311 also may include a capacitance 334 with one side, or "plate" , of the capacitance 334 connected between first inductance 330 and second inductance 332 and the other side, or plate, of capacitance 334 connected to modem 306. Thus, RF signal 310 may be passed through capacitance 334 between power line 312 and modem 306, and RF signal 310 and other noise may be filtered from 28 VDC power 321 on power line 312 through inductances 330 and 332, providing filtered DC power 321 to local power supply 322. For example, RF signal 310 may be selected to transmit data over one of any of four RF channels, which may have center frequencies, for example, of 13.847059 MHz, 15.105882 MHz, 16.364706 MHz, and 18.882353 MHz. The values of inductances 330 and 332 and capacitance 334 may be chosen to pass signals at the four exemplary center frequencies while filtering out other frequencies to ground (i.e., filtering out RF signals and other noise from the DC power provided by the power line to the local power supply. For example, filter 311 may be a high pass filter and may pass frequencies greater than 2 MHz and filter out frequencies below 2 MHz. For example, inductance 330 may be a 10 micro-Henry (µH) inductance, inductance 332 also may have a value of 10 µH, and capacitance 334 may have a value of 4.4 microfarads (µF).

Figure 5:
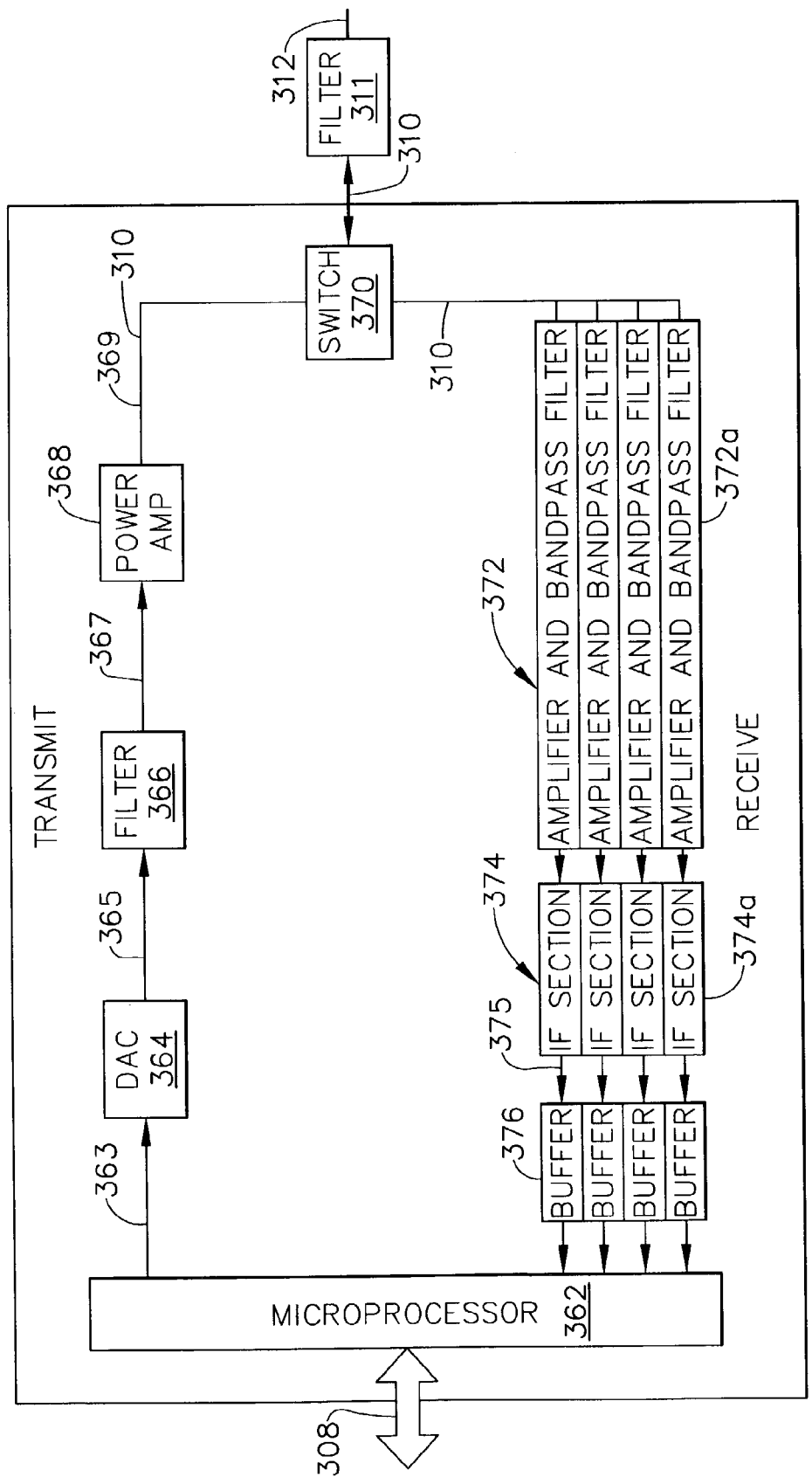
FIG. 5 is a block diagram illustrating a modem and filter, according to one embodiment of the present invention.

Referring now to FIG. 5, modem 360 is illustrated, according to one embodiment. Modem 360 may be used, for example, to implement any of modems 306 shown in FIGS. 3 and 4. Modem 360 may be implemented, for example, using a field programmable gate array (FPGA) or application specific integrated circuit (ASIC) and board available from Inari, Inc., of Draper, Utah. For example, product number IPL0201 is a modem ASIC that integrates a core central processing unit (CPU), input-output (I/O) ports, interface circuitry, buffer memory, transmitter digital to analog converter (DAC) interface, and serial receive channels.

Modem 360 may communicate digital data 308 back and forth with a host avionics unit—for example, any of avionics units 302 shown in FIG. 3. Modem 360 may modulate an RF signal 310 to transmit data 308. Modem 360 may demodulate RF signal 310 to receive data 308. Modem 360 may pass RF signal 310 to a bus of a power line network—such as bus 316 of data network 314—through a filter—such as filter 311.

A microprocessor 362, which, for example, may be integrated into the IPL0201, in modem 360 may control the bus protocol, provide encryption/decryption, and low-level maintenance functions for modem 360. Microprocessor 362 also may be implemented, for example, using an Intel® 8051 microcontroller. A host avionics system—such as host electronics 304 of avionics unit 302—may interface with modem 360 via microprocessor 362 through dual ported random access memory (RAM) in the host avionics system. The host avionics system may write data 308 in the dual ported RAM and then set a flag to indicate that data 308 is ready for transmission. When modem 360 has received data 308, via microprocessor 362, for example, microprocessor 362 may set a flag to indicate to the host system—such as host electronics 304—that data 308 has been received. Also, for example, data 308 may be passed between a host electronics 304 and microprocessor 362 using circular ring buffers with read and write indices to keep track of when new data 308 is received (or is ready to transmit). When data 308 is received, microprocessor 362 may write data 308 to the ring buffer and increment the write index, the remote host, i.e., host electronics 304, may monitor the write index and read data 308 from the ring buffer when the write index changes, incrementing the read index in the process. As long as the read and write indices are equal, the remote host 304 may conclude that no new data 308 has been received.

Microprocessor 362 may packet the data 308, and may select a frequency channel for transmission. Four different frequency channels may be provided so that, for example, if one channel is too noisy for adequate communication, a quieter channel may be selected. In the exemplary embodiment illustrated in FIG. 5, modem 360 may transmit or receive data over any of four RF channels, which may have center frequencies, for example, of 13.847059 MHz, 15.105882 MHz, 16.364706 MHz, and 18.882353 MHz. Thus, microprocessor 362 may select one of the four channel frequencies for transmission and send data packets in the form of digital pulses 363 to the digital to analog converter (DAC) 364.

DAC 364 may convert the digital pulses 363 to an RF modulated analog signal 365. For example, DAC 364 may PSK modulate an RF carrier at one of the four exemplary channel center frequencies described above by digital pulses 363. Filter 366 may shape the analog frequency response from DAC 364, for example, filtering signal 365 to produce signal 367, which may be fed to power amplifier 368. Power amplifier 368 may amplify signal 367 and output RF signal 310 to switch 370. Power amplifier 368 may be operated at a low output impedance to provide impedance matching between modem 360 and DC power line 312. For example, output 369 of power amplifier 368 may be adjusted to a low impedance, for example, approximately 10 ohms, in order to match the impedance of power line 312, which may be approximately 0 ohms. By way of contrast, AC power lines have a high impedance, for example, approximately 10,000 ohms, so that prior art transformer coupling of data to AC power lines has normally been accomplished at a high impedance, allowing prior art modem power amplifiers to operate at a high output impedance.

Switch 370 may be normally set to receive, i.e., to route RF signal 310 from filter 311 to the bank of bandpass filters and amplifiers 372. Switch 370 may only switch to transmit, i.e., to route RF signal 310 from power amplifier 368 to filter 311, when commanded by microprocessor 362. Thus, when modem 360 is transmitting data 308, switch 370 directs the transmit RF signal 310 from power amplifier 368 to the power line, for example, power line 312 via filter 311. Filter 311 may couple the transmit analog signal, i.e., RF signal 310, from switch 370 on to the 28 VDC power line, i.e. power line 312.

Filter 311 may be used to send and receive the analog signals, i.e., RF signal 310, to the 28VDC power line, i.e. power line 312. Filter 311 may couple the receive analog signal, i.e., RF signal 310, to switch 370 and on to the bank of bandpass filters and amplifiers 372, where each of the four frequency channels, for example, 13.847059 MHz, 15.105882 MHz, 16.364706 MHz, and 18.882353 MHz, has a corresponding bandpass filter.

Each bandpass filter, for example, bandpass filter 372a, may pass its analog signal, i.e., RF signal 310 at one of the four frequencies, i.e., on one of the four frequency channels, through an amplifier and into a corresponding intermediate frequency (IF) section—for example, IF section 374a of bank of IF sections 374.

Each of the IF sections 374 may convert the analog signals, i.e., RF signal 310, back into digital pulses 375. Digital pulses 375, for example, may be electrical pulses from 0.0 Volts to 5.0 Volts in value, suitable, for example, for use with transistor-transistor logic (TTL). Digital pulses 375 may be buffered, i.e., temporarily stored, in buffers 376, and sent to the microprocessor 362 as received data 308.

Figure 6:
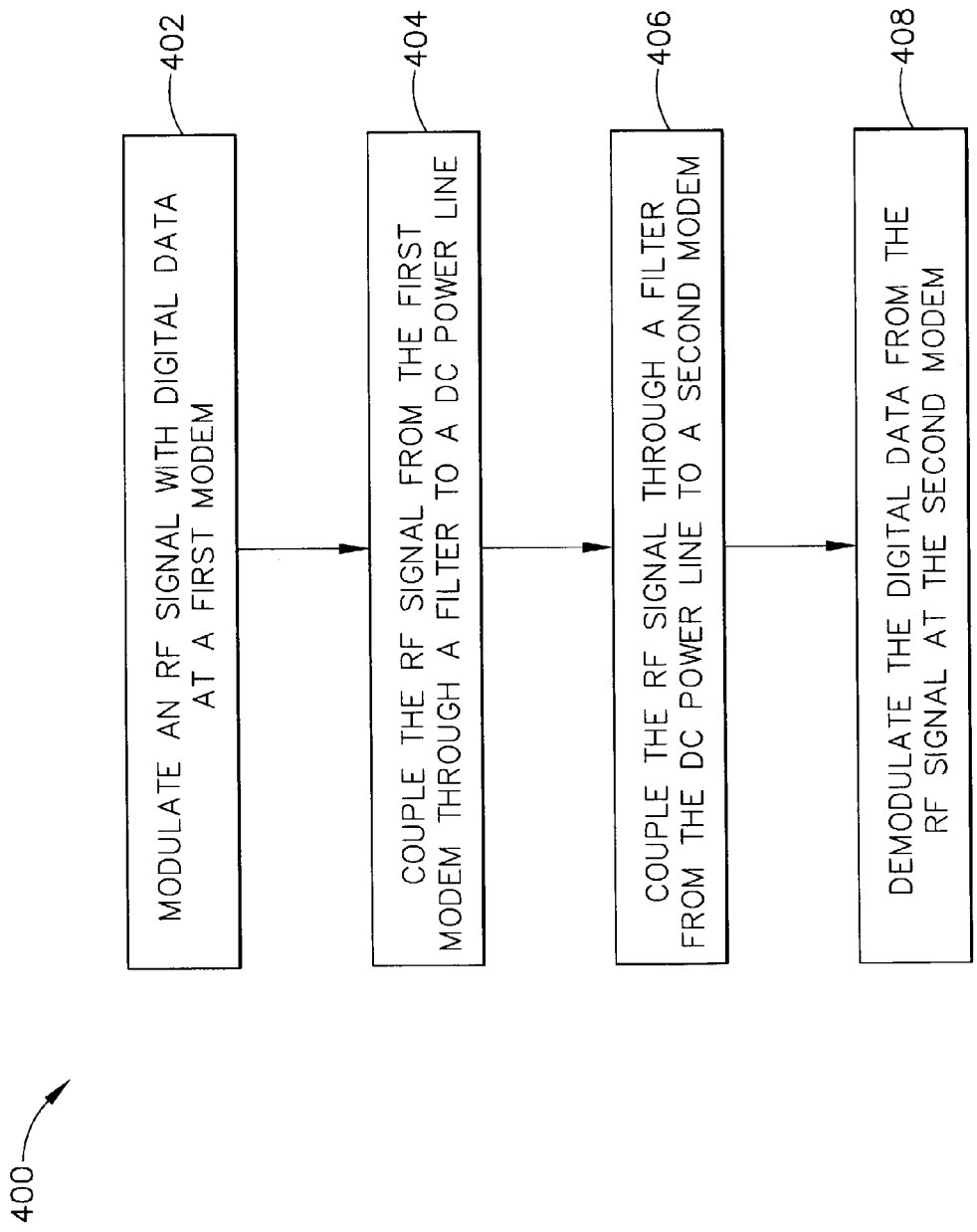
FIG. 6 is a flow chart illustrating a method for digital communication over a DC power line, in accordance with an embodiment of the present invention.

Referring now to FIG. 6, an exemplary embodiment of a method 400 for digital communication over a DC power line—such as power line 312, shown in FIG. 3—is illustrated by a flowchart. Exemplary method 400 may include steps 402, 404, 406, 408, 410, 412, 414, and 416, which conceptually delineate method 400 for purposes of conveniently illustrating method 400 according to one embodiment. Exemplary method 400 is illustrated with reference to FIGS. 3, 4, and 5.

Method 400 may begin with step 402, in which an RF signal is modulated with digital data at a first modem. For example, RF signal 310 may be modulated with digital data 308 from host electronics 304a at modem 306a, as described above.

Method 400 may continue with step 404, in which the RF signal from the first modem is coupled through a filter to a DC power line. For example, RF signal 310 may be coupled through filter 311a to power line 312. Filter 311 may be provided as a first inductance 330 connected in series with a second inductance 332, with a capacitance 334 connected between the two inductances 330 and 332 and also connected to a modem 306, as seen in FIG. 4, with values of inductances and capacitance appropriate for passing RF signal 310 to modem 306 while filtering out noise from power line 312.

Method 400 may continue with step 406, in which the RF signal on the DC power line is coupled through a filter to a second modem. For example, RF signal 310 on power line 312 may be coupled through filter 311*b* to modem 306*b*. Method 400 may continue with step 408, in which the digital data is demodulated from the RF signal at the second modem. For example, RF signal 310 may be demodulated at modem 306*b* to recover digital data 308 and provide digital data 308 to host electronics 304*b*.

It should be understood, of course, that the foregoing relates to preferred embodiments of the invention and that modifications may be made without departing from the spirit and scope of the invention as set forth in the following claims.

We claim:

1. A power line modem interface comprising:
a modem that modulates an RF signal with digital data;
a filter that is connected to said modem and that couples said RF signal from said modem to a DC power line;
a microcontroller connected in said modem that selects one of at least two channel frequencies for said RF signal that is modulated with said digital data; and
at least two amplifiers and bandpass filters, wherein said at least two amplifiers and bandpass filters operate to receive said RF signal on said at least two channel frequencies.

2. The power line modem interface of claim 1, further comprising:
a local power supply connected to the DC power line and connected to said filter, wherein:
said filter passes said RF signal to said modem; and
said filter filters out said RF signal from a DC power provided by the DC power line to the local power supply.

3. The power line modem interface of claim 1, further comprising a local power supply and wherein said filter comprises:
a first inductance connected to a hot side of the DC power line;
a second inductance connected in series with said first inductance and connected to said local power supply; and
a capacitance connected between said first inductance and said second inductance and connected to said modem so that said RF signal is passed from said modem to the DC power line.

4. The power line modem interface of claim 1, further comprising a power amplifier that is connected to said filter and that operates at low output impedance for impedance matching with the DC power line.

5. The power line modem interface of claim 1, wherein said modem demodulates said RF signal to recover said digital data and further comprising an amplifier and bandpass filter that are connected to said filter and couple said RF signal to the DC power line.

6. The power line modem interface of claim 1, further comprising a local power supply and wherein:
said local power supply connects to said modem and supplies power to said modem.

7. The power line modem interface of claim 1, further comprising:
a microcontroller connected in said modem and that interfaces with a host electronics of an avionics unit.

8. A power line modem interface comprising:
a modem that demodulates an RF signal to recover digital data;
a filter connected to said modem and to a DC power line, wherein said filter couples said RF signal from the DC power line to said modem;
a microcontroller connected in said modem that selects one of four channel frequencies for said RF signal that is modulated with said digital data; and
four amplifiers and bandpass filters, wherein said four amplifiers and bandpass filters operate to receive said RF signal on said four channel frequencies.

9. The power line modem interface of claim 8, further comprising:
a local power supply connected to the DC power line and connected to said filter, wherein:
said filter passes said RF signal to said modem;
said filter filters out said RF signal from said local power supply.

10. The power line modem interface of claim 8, further comprising a local power supply and wherein said filter comprises:
a first inductance connected to a hot side of the DC power line;
a second inductance connected in series with said first inductance and connected to said local power supply; and
a capacitance with a first plate connected between said first inductance and said second inductance and a second plate connected to said modem so that said RF signal is coupled from said modem to the DC power line.

11. The power line modem interface of claim 8, wherein said modem modulates said RF signal with said digital data and further comprising:
a power amplifier that is connected to said filter, that operates to output said RF signal at a low output impedance, and that provides impedance matching with the DC power line.

12. The power line modem interface of claim 8, further comprising an amplifier and bandpass filter that are connected to said filter, that operate to receive said RE signal from the DC power line.

13. The power line modem interface of claim 8, further comprising a local power supply and wherein:
said local power supply connects to said modem and to said filter and supplies filtered DC power to said modem.

14. The power line modem interface of claim 8, further comprising:
a microcontroller connected in said modem and that interfaces through a dual ported RAM with a host electronics of an avionics unit.

15. A filter for coupling an RF signal from a modem to a DC power line that supplies power to a local power supply, said filter comprising:
a first inductance connected to a hot side of the DC power line;
a second inductance connected in series with said first inductance and connected to the local power supply; and
a capacitance with a first plate connected between said first inductance and said second inductance and a second plate connected to a modem so that said RF signal is passed between the modem and the DC power line.

16. The filter of claim 15, wherein said filter is a high pass filter that passes frequencies above 2 MHz.

17. An avionics unit comprising:
a host electronics with a dual ported RAM interface;
a modem that modulates a first RF signal with first digital data and that demodulates a second RF signal to recover second digital data;
a microcontroller that is connected in said modem and that interfaces said modem with said host electronics through said dual ported RAM, said microcontroller receiving said first digital data from said host electronics and said microcontroller sending said second digital data to said host electronics;
a filter connected to said modem and to a DC power line wherein said filter couples said first RF signal from said modem to the DC power line and couples said second RF signal from the DC power line to said modem; and wherein said filter comprises:
a first inductance connected to a hot side of the DC power line;
a second inductance connected in series with said first inductance and connected to said local power supply; and
a capacitance with a first plate connected between said first inductance and said second inductance and a second plate connected to said modem so that said first RF signal is passed from said modem to the DC power line and said second RF signal is passed from the DC power line to said modem; and
a local power supply connected to the DC power line and connected to said filter, wherein said filter passes said RF signal to said modem; and said filter filters out said RF signal from said local power supply.

18. The avionics unit of claim 17, wherein said modem includes:
a power amplifier that is connected to said filter, that operates to output said RF signal at a low output impedance, and that provides impedance matching with the DC power line.

19. The avionics unit of claim 17, wherein said modem includes:
an amplifier and bandpass filter that are connected to said filter, that operate to receive said RF signal from the DC power line.

20. An avionics system comprising:
a DC power line that supplies a 28 VDC power;
a local power supply connected to a DC return of said DC power line;
a host electronics with a dual ported RAM interface;
a modem that modulates a first RF signal with first digital data and that demodulates a second RF signal to recover second digital data;
a microcontroller that is connected in said modem and that interfaces said modem with said host electronics through said dual ported RAM, said microcontroller receiving said first digital data from said host electronics and said microcontroller sending said second digital data to said host electronics; and
a filter connected to said modem and to a hot side of said DC power line wherein said filter couples said first RF signal from said modem to the DC power line and couples said second RF signal from the DC power line to said modem; said filter connected to said local power supply wherein said filter filters out said RF signal from said local power supply; and said filter including:
a first inductance connected to a hot side of the DC power line;
a second inductance connected in series with said first inductance and connected to said local power supply; and
a capacitance with a first plate connected between said first inductance and said second inductance and a second plate connected to said modem so that said first RF signal is passed from said modem to the DC power line and said second RF signal is passed from the DC power line to said modem.

21. The avionics system of claim 20, wherein said modem includes:
a power amplifier that is connected to said filter, that operates to output said first RF signal at a low output impedance, and that provides impedance matching with the DC power line.

22. The avionics system of claim 20, wherein said modem includes:
an amplifier and bandpass filter that are connected to said filter, that operate to receive said RF signal from the DC power line.

23. A method for digital communication over a DC power line comprising steps of:
modulating an RF signal with digital data at a first modem;
coupling said RF signal from said first modem to said DC power line through a filter, including:
connecting a first inductance and a second inductance to each other in series in said DC power line;
connecting a first side of a capacitor between said first inductance and said second inductance;
connecting a second side of said capacitor to said modem;
propagating said signal through said capacitor onto said power line;
coupling said RF signal from said DC power line to a second modem through a second filter; and
demodulating said data from said RF signal at said second modem.

24. The method of claim 23, wherein said step of coupling said RF signal to said second modem comprises:
connecting a first inductance and a second inductance to each other in series in said DC power line;
connecting a first side of a capacitor between said first inductance and said second inductance;
connecting a second side of said capacitor to said modem;
propagating said signal from said power line through said capacitor.

25. The method of claim 23, wherein said step of coupling said RF signal from said first modem comprises:
matching a low impedance at an output of said modem to a low impedance of said DC power line.

26. The method of claim 23, wherein said step of coupling said RF signal to said second modem comprises:
coupling said RF signal from said DC power line to said second modem.

* * * * *